Patented Nov. 8, 1938

2,136,335

UNITED STATES PATENT OFFICE 2,136,335

PROCESS OF PRESERVING RUBBER, AND PRODUCT

Howard I. Cramer, Cuyahoga Falls, Ohio, assignor to Wingfoot Corporation, Wilmington, Del., a corporation of Delaware No Drawing. Application June 25, 1935, Serial No. 28,294

7 Claims. (Cl. 18—50)

This invention relates to antioxidants for rubber and, more particularly, to secondary amines in which one aromatic substituent has been hydrogenated.

Numerous age resisters or antioxidants have been proposed for the purpose of treating rubber to retard deterioration, among these being the secondary aromatic amines. It has now been found that diaryl amines in which one aryl group consists of a condensed nucleus which has been hydrogenated, also constitute valuable age resisters and have the power of enhancing resistance to deterioration by flexing in the rubber products in which they are incorporated. These secondary amines, characterized by the presence of a hydrogenated nucleus of the aforementioned type, show little tendency to bloom on the surface of the rubber article in which they have been incorporated and are readily dispersed in the unvulcanized rubber.

The class of improved age resisters includes those secondary amines in which there is present one normal aromatic nucleus, such as phenyl, and one hydrogenated condensed nucleus derived from a compound containing at least six additional hydrogen atoms, such as hexahydro naphthalene. Thus, there may be used phenyl hexahydro naphthylamine, phenyl octahydro naphthylamine and phenyl decahydro naphthylamine. The phenyl group may, of course, be replaced by other organic nuclei, such as those of toluene, xylene, cumidine, naphthalene, and others. The age resisters so formed include ortho tolyl hexahydro naphthylamine, naphthyl hexa hydro naphthylamine, etc., either the alpha or beta form of the hydronaphthyl or naphthyl group being present.

The hydrogenated naphthyl group of the secondary amine may be replaced by other hydrogenated condensed nuclei, such as those of indene, fluorene, methyl naphthalene, phenanthrene, acenaphthene, or anthracene. As examples of these there may be mentioned phenyl hexa hydro fluorenylamine, tolyl octa hydro phenanthryl amine and naphthyl hexahydro acenaphthenyl amine. Obviously the amino nitrogen of the secondary amine may be attached in various ways to the hydrogenated nucleus and different isomers thus formed.

It will be observed that the secondary amines mentioned, whether containing a naphthalene or other condensed nucleus, have at least six more hydrogen atoms in such nucleus than would be present in the unhydrogenated nucleus in the same combination. For example, the hexahydro naphthyl substituent will contain, in the compound phenyl hexahydro naphthylamine, a total of 13 atoms, being the residue of hexahydro naphthalene which contains 14 hydrogen atoms. In the same way, the octa hydro naphthyl radical will contain 15 hydrogen atoms and the decahydro naphthyl radical will contain 17 hydrogen atoms. Likewise, the other condensed nuclei or poly nuclear radicals will contain at least six additional hydrogen atoms and may contain more.

These age resisters or antioxidants may be prepared by catalytic hydrogenation under pressure of the corresponding secondary diaryl amine at elevated pressures and temperatures. Various catalysts may be used to control and promote the reaction, such as catalysts of nickel and chromite. Synthetic methods may also be used to produce the compounds.

The age resisters may be applied in any feasible manner, as by incorporating the same in a rubber mix of vulcanization characteristics while the latter is on the mill, or by applying the antioxidant to the surface of the rubber article in the unvulcanized condition, or by addition to rubber latex before its coagulation. A suitable mix, incorporating the antioxidant in the rubber, is made up according to the following formula:

| | Parts |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1.0 |

The term "rubber" is employed in the claims in an inclusive sense to include rubber, synthetic rubber, reclaimed rubber, balata, gutta percha, rubber isomers, and similar products, whether or not the same have been admixed with fillers, pigments, vulcanizing agents and the like.

While there have been described above certain preferred embodiments of the invention, the same are for purposes of illustration and the invention is not limited thereto. It will be apparent that numerous changes may be made, as pointed out herein, in the chemicals employed without departing from the inventive concept, and it is intended that the patent shall cover, by suitable expression in the appended claims, all features of patentable novelty residing in the invention.

What I claim is:

1. The process of improving the age resisting characteristics of rubber which comprises treating the same with a hydrogenated secondary naphthyl aryl amine in which the naphthyl nucleus contains an odd number of hydrogen atoms from thirteen to fifteen inclusive.

2. The process of improving the age resisting characteristics of rubber which comprises treating the same with a hexa hydro secondary naphthyl aryl amine.

3. The process of improving the age resisting characteristics of rubber which comprises treating the same with an octa hydro naphthyl aryl amine.

4. The process of improving the age resisting characteristics of rubber which comprises treating the same with hexa hydro naphthyl phenyl amine.

5. The process of improving the age resisting characteristics of rubber which comprises treating the same with octa hydro naphthyl phenyl amine.

6. An age resisting rubber composition comprising rubber and a hexa hydro secondary naphthyl aryl amine.

7. An age resisting rubber composition comprising rubber and an octa hydro naphthyl aryl amine.

HOWARD I. CRAMER.